UNITED STATES PATENT OFFICE.

JOSEPH B. SHAW, OF ALFRED, NEW YORK, ASSIGNOR OF ONE-SIXTH TO ISAAC H. SHAW AND ONE-SIXTH TO WILLIAM G. TICE, BOTH OF TRENTON, NEW JERSEY.

ART OF MAKING ARTICLES FROM BLAST-FURNACE SLAG.

1,259,304. Specification of Letters Patent. Patented Mar. 12, 1918.

No Drawing. Application filed May 23, 1917. Serial No. 170,496.

*To all whom it may concern:*

Be it known that I, JOSEPH B. SHAW, a citizen of the United States, residing at Alfred, in the county of Allegany and State of New York, have invented new and useful Improvements in the Art of Making Articles from Blast-Furnace Slag, of which the following is a specification.

The present invention relates to the art of making brick, blocks and articles of desired shapes from blast furnace slag.

The primary object of the invention is to provide a method whereby the large quantities of slag made in America may be utilized by converting it into brick, blocks and similar articles for paving and other purposes. European slags have been used for such purposes for many years and the manufacturing methods used in Europe have long been common knowledge in America. Applicant, in common with many other engineers, has applied the European methods to American slag, but without success, and prior to the present invention it has been impossible to produce a satisfactory brick, block or other shape as a commercial product, from American slag.

With respect to American slag the situation is clearly shown by the discussion in the *Transactions of the American Ceramic Society*, Vol. XVIII, p. 911, from which it appears that attempts had been made to make paving brick by melting synthetic mixtures of shale and dolomite and from which it appeared that iron slags are not suitable for making slag brick, and that copper slags only have been successfully used.

The imported slag brick used in America is obtained mostly from Middlesborough, England. They are made from blast furnace slag which differs from the American slag to quite a considerable degree chemically. They take the liquid slag, pour it into a mold which is made in two halves; soon as it is solidified sufficiently to remove without breaking, they open the mold and throw these red hot bricks into the kilns. After the kiln is full it is closed and the bricks are allowed to anneal from their own residual heat. Experiments have been made in America in an attempt to accomplish the same result with American slag, but the blast furnace slag usually produced in America is of an entirely different character, as compared with that produced in England, it being more glass-like, while the English slag resembles stone; and in attempting to do the same thing, it has been found that the slags made here are inclined to be very brittle. The silica in the English slag is about 26%, the alumina about 22%; the average slag in the United States will run about 34% silica and 14% alumina.

The reasons why previously known methods of using slag have been successfully applied to European slags but failed on American slags I believe to be as follows:

1. The European slags differ from those produced in America in the respect that they are naturally tougher than American slags and, therefore, do not become so brittle as a result of internal strains.

2. The chemical and physical nature of the European slags make them capable of being converted into a tough product under a wide variation of heat treatments, while American slags treated according to any previously known method result in a brittle worthless product. American slags are very sensitive to slight changes of heat treatment, and a good product can be secured only by definitely and specifically producing and controlling the changes and conditions which occur in the process, as hereinafter described.

This difference between the European and American slags may be further shown by reference to British patent to Smith, Bessemer and Langsdon, No. 1835, A. D. 1854, page 10, lines 5 to 11. According to that patent, the English or European slag is capable of being rolled and pressed into form in a manner similar to that employed in the making of glass articles. American slags, however, cannot possibly be so utilized because a solid crust forms as soon as the slag comes in contact with any cold surface and this crust crushes, thereby destroying any article so made.

Furthermore, according to the patent referred to, when the article is cast in iron molds the center of the cast article must be solid before the article can be removed from the mold; and it is further specified that when sand molds are used the article is left therein until the center of the article is solid. It is also stated that if the article is removed from the mold while the center is still fluid the article will lose its shape.

The characteristic nature of the American slags is such that a very shallow, chilled, solid shell forms on the surface immediately on coming into contact with a cool surface. This shell is very strong and the article can be removed from the original supporting mold without change of shape, such as occurs in European slags so handled, while the great mass of the interior is still in a fluid state.

The use of sand molds as described in the British patent referred to cannot be applied to American slags because the surface of the molded article chills and solidifies immediately upon coming into contact with the cold sand, forming an exterior shell or crust, and this solid shell or crust having once been formed must be subsequently converted back to the amorphous state by heating it to the fusion point and then allowing it to solidify concurrently with the solidification of the interior of the article; therefore, the method of casting the slag in cold sand molds and then covering the article and allowing it to cool in the bed of sand cannot successfully be applied to American slags.

Another essential difference between the treatment required by European and American slags is shown in the patent referred to. From that patent it appears that the greatest toughness and strength is obtained by most thorough devitrification of European slags, but when American slags are allowed to solidify and are then subjected to extensive devitrification by prolonging and increasing the heat, very large crystals form and the article becomes very weak and brittle.

Another very important difference between European and American slags is that articles made from American slags cannot be annealed in contact with air in furnaces as is commonly done with European slags. When American slags are held at red heat or at higher temperatures where air or furnace gases can come freely into contact with them, the slag granulates very much the same as when a stream of cold water or cold air is blown against a stream of molten slag or when molten slag is run into water. Sometimes the depth of the surface which granulates will be only one-eighth of an inch, but generally it will be much greater, and very frequently the entire body of the article will be granulated and entirely destroyed, being easily crushed to a powder between the fingers. Consequently, American slag must be protected from air currents and furnace gases when above a red heat.

Having explained the essential difference between American and European slags and having shown why the manufacturing processes used on European slags cannot be successfully applied to American slags for the purpose of making brick, paving blocks and other articles, the process forming the subject of the present invention will now be described, whereby American slags can be so utilized. The method of procedure is to collect the molten slag in pots or any suitable containers as it runs from the blast furnace and then either to allow it to stand without further heat for a sufficient length of time to settle and free itself from entrapped gases or to permit it to stand after the addition of sand, raw potato, niter or other agent which will give off a gas and boil the pot of slag, thereby freeing the slag from gases and bringing it into a dense, liquid state ready to pour. After the above mentioned treatment, the slag is poured into iron or other molds suitably designed to give the desired shape to the article and so constructed as to permit the molded article to be easily and readily removed. The slag immediately upon being poured into the mold forms a strong crust or shell on the mold-engaging surfaces of the article, caused by this portion of the slag cooling below its fusion temperature. The article will cool rapidly and become entirely solid if left in the mold, and one of the essential features of this process is to prevent solidification of the interior of the article until after the exterior shell or crust has been converted back to an amorphous state by fusion. To do this the article is removed from the mold while the interior is still in a fused liquid state. Immediately after such removal of the article from the original mold, sufficient heat is applied to the exterior solid shell or crust, partly from without and partly from the fused liquid interior, to bring it back to the amorphous state of viscous liquid. Such heat is applied to the exterior of the article preferably by covering the same with red hot sand or other similar red hot substance; although such heat may, if desired, be applied by placing the article in a second mold which is heated to receive the article or which will admit of being heated in contact with the slag and then heating it in this mold. It is desirable not to prolong or continue the heat after casting but rather to convert the exterior shell or crust of the article back to the amorphous state as quickly as possible after removal of the article from the original mold, preferably in a few minutes. This having been accomplished, the entire body of the article is now cooled in any suitable manner to cause solidification of the exterior and the interior part at substantially the same time and at the same rate. Best results are obtained by cooling as rapidly as possible so long as the entire body of the article is cooled at substantially the same rate. From twelve to eighteen hours is sufficient time for cooling from the amorphous state to the atmospheric temperature.

When the molten slag is poured into the molds to cast the articles it will have a temperature ranging between 900° and 1400° C. In the average case, the temperature of the molten interior of the article will drop about 100° C. and the temperature of the outer crust or shell will be about 700° C. by the time the article is subjected to heat to convert the exterior shell or crust thereof to an amorphous state, requiring the application of heat at a temperature ranging between 500° and 1000° C. to the shell or crust of the article in order to reduce it to an amorphous state.

Bricks, paving blocks and other articles cast in the desired forms, in accordance with the present invention, from American blast furnace slag are dense and tough, and, when subjected to the "standard rattler test" as specified by The American Society for Testing Materials, they will lose not more than 16% of their original weight.

Having thus described my invention, what I claim as new and desire to secure by Letters Patent is:

1. The process of making molded slag articles of a dense structure from blast furnace slags, which consists in collecting the molten slag as discharged from the furnace or cupola, permitting the slag to settle and adding during the settling process an agent which will accelerate the liberation of gas from the slag; pouring the slag, before it loses its fluidity, into molds, permitting a thin crust or shell to form on the surface and then removing the article from the mold while the great mass of the interior is still in the fluid state; converting the solid crust or shell back to the amorphous state of viscous liquid before the interior of the article solidifies, while the article is surrounded by an envelop of heated solid material which substantially excludes air and furnace gases from it; and then gradually cooling the entire article at substantially the same rate and time.

2. The process of making molded slag articles of a dense structure from blast furnace slags, which consists in collecting the molten slag as discharged from the furnace or cupola, permitting the slag to settle and adding during the settling process an agent which will accelerate the liberation of a gas from the slag; pouring the slag, before it loses its fluidity, into molds, permitting a thin crust or shell to form on the surface and then removing the article from the mold while the great mass of the interior is still in the fluid state; converting the solid crust or shell back to the amorphous state of viscous liquid before the interior of the article solidifies, and then gradually cooling the entire article at substantially the same rate and time.

3. The process of making molded slag articles of a dense structure from blast furnace slags, which consists in collecting the molten slag as discharged from the furnace or cupola, permitting the slag to settle and adding during the settling process an agent which will accelerate the liberation of gas from the slag, pouring the slag before it loses its fluidity, into molds, permitting a thin crust or shell to form on the surface and then removing the article from the mold while the great mass of the interior is still in the fluid state; then raising the temperature of the solidified exterior of the article practically to its fusion point before the interior of the article solidifies, while the article is surrounded by an envelop of heated solid material which substantially excludes air and furnace gases from it; and then gradually cooling the entire article at substantially the same rate and time.

4. The process of making molded slag articles of a dense structure from blast furnace slags, which consists in collecting the molten slag as discharged from the furnace or cupola; permitting the slag to settle and adding during the settling process an agent which will accelerate the liberation of gas from the slag; pouring the slag, before it loses its fluidity, into molds, permitting a thin crust or shell to form on the surface and then removing the article from the mold while the great mass of the interior is still in the fluid state; then raising the temperature of the solidified exterior of the article practically to its fusion point before the interior of the article solidifies; and then gradually cooling the entire article at substantially the same rate and time.

5. The process of making molded slag articles of a dense structure from blast furnace slags, which consists in pouring the slag before it loses its fluidity into molds, permitting a thin crust or shell to form on the surface and then removing the article from the mold while the great mass of the interior is still in the fluid state; converting the solid crust or shell back to the amorphous state of viscous liquid while reducing the temperature of the great mass of its interior, before the interior of the article solidifies while the article is surrounded by an envelop of heated solid material which substantially excludes air and furnace gases from it; and then gradually cooling the entire article at substantially the same rate and time.

6. The process of making molded slag articles of a dense structure from blast furnace slags, which consists in pouring the slag before it loses its fluidity into molds, permitting a thin crust or shell to form on the surface and then removing the article from the mold while the great mass of the interior is still in the fluid state; converting the solid crust or shell back to the amorphous state of viscous liquid, before the interior of the article solidifies while the article is surrounded by an envelop of heated solid material which substantially excludes air and furnace gases from it; and then gradually cooling the entire article at substantially the same rate and time.

7. The process of making molded slag articles of a dense structure from blast furnace slags, which consists in pouring the slag before it loses its fluidity into molds, permitting a thin crust or shell to form on the surface and then removing the article from the mold while the great mass of the interior is still in the fluid state; converting the solid crust or shell back to the amorphous state of viscous liquid while reducing the temperature of the great mass of its interior, before the interior of the article solidifies; and then gradually cooling the entire article at substantially the same rate and time.

8. The process of making molded slag articles of a dense structure from blast furnace slags, which consists in pouring the slag before it loses its fluidity into molds, permitting a thin crust or shell to form on the surface and then removing the article from the mold while the great mass of the interior is still in the fluid state; converting the solid crust or shell back to the amorphous state of viscous liquid before the interior of the article solidifies; and then gradually cooling the entire article at substantially the same rate and time.

9. The process of making molded slag articles of a dense structure from blast furnace slags, which consists in pouring the slag before it loses its fluidity into molds, permitting a thin crust or shell to form on the surface and then removing the article from the mold while the great mass of the interior is still in the fluid state; then raising the temperature of the solidified exterior of the article practically to its fusion point while reducing the temperature of the great mass of its interior, before the interior of the article solidifies, while the article is surrounded by an envelop of heated, solid material which substantially excludes air and furnace gases from it; and then gradually cooling the entire article at substantially the same rate and time.

10. The process of making molded slag articles of a dense structure from blast furnace slags, which consists in pouring the slag before it loses its fluidity into molds, permitting a thin crust or shell to form on the surface and then removing the article from the mold while the great mass of the interior is still in a fluid state; then raising the temperature of the solidified exterior of the article practically to its fusion point while reducing the temperature of the great mass of its interior before the interior of the article solidifies; and then gradually cooling the entire article at the same rate and time.

11. The process of making molded slag articles of a dense structure from blast furnace slags, which consists in pouring the slag before it loses its fluidity into molds, permitting a thin crust or shell to form on the surface and then removing the articles from the mold while the great mass of the interior is still in a fluid state; then raising the temperature of the solidified exterior of the article practically to its fusion point, before the interior of the article solidifies while the article is surrounded by an envelop of heated, solid material which substantially excludes air and furnace gases from it; and then gradually cooling the entire article at substantially the same rate and time.

12. The process of making molded slag articles of a dense structure from blast furnace slags, which consists in pouring the slag before it loses its fluidity into molds, permitting a thin crust or shell to form on the surface and then removing the article from the mold while the great mass of the interior is still in a fluid state; then raising the temperature of the solidified exterior of the article practically to its fusion point, before the interior of the article solidifies; and then gradually cooling the entire article at substantially the same rate and time.

13. The process of making molded slag articles of a dense structure from blast furnace slags, which consists in pouring the slag before it loses its fluidity into molds, permitting a thin crust or shell to form on the surface; converting the solid crust or shell back to the amorphous state of viscous liquid while reducing the temperature of the great mass of the interior of the article, before the interior of the article solidifies while the article is surrounded by an envelop of heated, solid material which substantially excludes air and furnace gases from it; and then gradually cooling the entire article at substantially the same rate and time.

14. The process of making molded slag articles of a dense structure from blast furnace slags, which consists in pouring the slag before it loses its fluidity into molds, permitting a thin crust or shell to form on the surface; converting the solid crust or shell back to the amorphous state of viscous liquid while reducing the temperature of the great mass of its interior, before the interior of the article solidifies; and then gradually cooling the entire article at substantially the same rate and time.

15. The process of making molded slag articles of a dense structure from blast furnace slags, which consists in pouring the slag before it loses its fluidity into molds, permitting a thin crust or shell to form on the surface; converting the solid crust or shell back to the amorphous state of viscous liquid, before the interior of the article solidifies while the article is surrounded by an envelop of heated, solid material which substantially excludes air and furnace gases from it; and then gradually cooling the entire article at substantially the same rate and time.

16. The process of making molded slag articles of a dense structure from blast furnace slags, which consists in pouring the slag before it loses its fluidity into molds, permitting a thin crust or shell to form on the surface; converting the solid crust or shell back to the amorphous state of viscous liquid, before the interior of the article solidifies; and then gradually cooling the entire article at substantially the same rate and time.

17. The process of making molded slag articles of a dense structure from blast furnace slags, which consists in pouring the slag before it loses its fluidity into molds, permitting a thin crust or shell to form on the surface; then raising the temperature of the solidified exterior of the article practically to its fusion point while reducing the temperature of the great mass of its interior, before the interior of the article solidifies while the article is surrounded by an envelop of heated, solid material which substantially excludes air and furnace gases from it; and then gradually cooling the entire article at substantially the same rate and time.

18. The process of making molded slag articles of a dense structure from blast furnace slags, which consists in pouring the slag before it loses its fluidity into molds, permitting a thin crust or shell to form on the surface; then raising the temperature of the solidified exterior of the article practically to its fusion point while reducing the temperature of the great mass of its interior, before the interior of the article solidifies; and then gradually cooling the entire article at substantially the same rate and time.

19. The process of making molded slag articles of a dense structure from blast furnace slags, which consists in pouring the slag before it loses its fluidity into molds, permitting a thin crust or shell to form on the surface; then raising the temperature of the solidified exterior of the article practically to its fusion point, before the interior of the article solidifies while the article is surrounded by an envelop of heated solid material which substantially excludes air and furnace gases from it; and then gradually cooling the entire article at substantially the same rate and time.

20. The process of making molded slag articles of a dense structure from blast furnace slags, which consists in pouring the slag before it loses its fluidity into molds, permitting a thin crust or shell to form on the surface; then raising the temperature of the solidified exterior of the article practically to its fusion point, before the interior of the article solidifies; and then gradually cooling the entire article at substantially the same rate and time.

In testimony whereof I have hereunto set my hand in presence of two subscribing witnesses.

JOSEPH B. SHAW.

Witnesses:
 JOSIAH STEYKER,
 LILLIAN HALL.